United States Patent [19]

Althaus et al.

[11] Patent Number: 5,465,569
[45] Date of Patent: Nov. 14, 1995

[54] METHOD OF ESTABLISHING PART-LOAD OPERATION IN A GAS TURBINE GROUP

[75] Inventors: Rolf Althaus, Flawil, Switzerland; Yau-Pin Chyou, Taipei, Taiwan; Hans U. Frutschi, Riniken, Switzerland; Christian Genet, Untersiggenthal, Switzerland; Peter Kamber, Simsbury, Conn.; Anders Lindvall, Baden, Switzerland; Thomas Sattelmayer, Mandach, Switzerland; Peter Senior, Mellingen, Switzerland; Peter Rufli, Fislisbach, Switzerland

[73] Assignee: ABB Management AG, Baden, Switzerland

[21] Appl. No.: 290,287

[22] Filed: Aug. 15, 1994

[30] Foreign Application Priority Data

Sep. 6, 1993 [EP] European Pat. Off. .............. 93114230

[51] Int. Cl.⁶ .................................. F02C 9/00; F02G 3/00
[52] U.S. Cl. .................. 60/39.03; 60/39.161; 60/39.281
[58] Field of Search ............................ 60/39.03, 39.161, 60/39.27, 39.281

[56] References Cited

U.S. PATENT DOCUMENTS

| | | | |
|---|---|---|---|
| 3,054,257 | 9/1962 | Schelp | 60/39.511 |
| 3,777,479 | 12/1973 | Hagen | 60/39.281 |
| 3,919,838 | 11/1975 | Armstrong et al. | 60/39.281 |
| 3,921,390 | 11/1975 | Stoltman | 60/39.281 |
| 3,938,321 | 2/1976 | Davis et al. | 60/39.281 |
| 4,896,499 | 1/1990 | Rice | 60/39.161 |
| 5,103,630 | 4/1992 | Correa | 60/39.161 |

FOREIGN PATENT DOCUMENTS

| | | |
|---|---|---|
| 218724 | 4/1942 | Switzerland . |
| 250742 | 7/1948 | Switzerland . |

Primary Examiner—Richard A. Bertsch
Assistant Examiner—Howard R. Richman
Attorney, Agent, or Firm—Burns, Doane, Swecker & Mathis

[57] ABSTRACT

A method of establishing part-load operation is proposed for a turbine group. This gas turbine group consists essentially of a compressor unit (1), of an HP combustion chamber (4) downstream of the compressor unit (1), of an HP turbine (5) downstream of this HP combustion chamber (4), of an LP combustion chamber (8) operating by self-ignition and arranged downstream of the HP turbine (5), the hot gases (10) of which LP combustion chamber (8) being admitted to an LP turbine (11). The temperature at outlet from the HP turbine (5) remains essentially the same due to the reduction of the fuel quantity in the LP combustion chamber (8) to zero. Furthermore, the fuel quantity of the HP combustion chamber (4) remains approximately constant during the reduction of the fuel quantity in the LP combustion chamber (8) so that the temperature at inlet to the HP turbine (5) likewise remains constant.

10 Claims, 3 Drawing Sheets

METHOD OF ESTABLISHING PART-LOAD OPERATION IN A GAS TURBINE GROUP

BACKGROUND OF THE INVENTION

1. Field of the Invention

The present invention relates to a method of establishing part-load operation in a gas turbine group.

2. Discussion of Background

When reduced power is required, it is known to effect the part load of gas turbine groups by means of a fuel control system. The turbine inlet temperature is reduced by reducing the fuel supply while the airflow remains constant. This intrinsically simple establishment of part-load operation is found to be insufficiently attractive with respect to efficiency, the efficiency falling, in fact, almost in direct proportion to the reduction in power.

In an attempt to keep this relatively high loss of efficiency within closer limits, it has already been proposed to undertake the reduction in power by means of an additional adjustment to the compressor guide vanes. In this control system, there is a smaller loss in thermal efficiency and the loss is of the order of value of up to two percentage points but it is only possible to reduce the mass flow, and therefore the power, down to approximately 80% with such a control system. The control range practiced in this manner, i.e. from 100% to 80%, is limited by the severe increase in the turbine outlet temperature, which is a consequence of a fall in pressure ratio at a turbine inlet temperature which is kept, as far as possible, at a constantly high level.

In a gas turbine group in which a high-pressure combustion chamber operates downstream of the compressor group and in which the hot gases are prepared for admission to a high-pressure turbine and in which the exhaust gases from the latter, which are at high temperature, subsequently flow through a so-called low-pressure combustion chamber before they are admitted to a low-pressure turbine, the requirements for establishing part-load operation have to be defined afresh, particularly where the low-pressure combustion chamber is designed for self-ignition.

Although it would be possible to decrease the power by closing the inlet guide vane row (where such a possibility is available at all), this would inevitably cause a reduction in the fuel quantity in the two combustion chambers of the gas turbine group. If the low-pressure combustion chamber is designed for self-ignition, the fuel quantities cannot be further reduced simultaneously because it would no longer be possible to maintain the temperature of the exhaust gases from the high-pressure turbine for subsequent self-ignition in the low-pressure combustion chamber.

SUMMARY OF THE INVENTION

Accordingly, one object of the invention, as described in the claims, is to provide a novel control method, of the type mentioned at the beginning, which permits part-load operation down to approximately 40% by means of a simple control concept while taking account of the fact that the low-pressure combustion chamber is designed for self-ignition.

The essential advantages of the invention may be seen in the fact that the complete reduction in power also takes place at maximized part-load efficiency without employing blade adjustment in the region of the compressor unit.

Until the reduction in power is introduced, there is a temperature reserve available in the second combustion chamber (low-pressure combustion chamber) which permits reliable self-ignition. As soon as the fuel quantity is reduced at this location, the power of the gas turbine group falls within the desired range without there being appreciable displacement to the machine operating points.

The efficiency of the gas turbine group remains approximately unaltered at part-load as long as the fuel quantity for the first combustion chamber (high-pressure combustion chamber) is kept constant.

If the compressor unit provides a blading adjustment possibility, the adjustment can be subsequently used for a further reduction in the power, the latter in effective connection with the fuel quantity supply to the first combustion chamber. This adjustment can also, of course, be introduced before fuel control.

The effective connection between the possibility of adjusting the blades in the compressor unit and the control of the fuel quantity in the first combustion chamber provides advantageous control methods for part-load operation, for example:

With the inlet guide vane row open, the fuel supply to the second combustion chamber is first reduced until a part-load of approximately 50% is reached. In this range, the flame in this combustion chamber goes out. The exhaust gases flow from the first turbine without further thermal preparation and are admitted to the second turbine.

In a further step, the inlet guide vane row is adjusted in such a way that no reduction of temperature takes place initially in the first combustion chamber. Successive closing of the inlet guide vane row then takes place down to approximately 75% of the power previously operated, with the fuel quantity in the first combustion chamber being reduced because less air is flowing. This reduction, however, only takes place within the range set to ensure the maintenance of the temperature before the first turbine. Temperature reduction within the first combustion chamber then takes place. As already mentioned, the adjustment of the inlet guide vane row can however be introduced first, before the fuel supply to the second combustion chamber is controlled.

A further advantage of the invention may be seen in the fact that there is, in this case, an integrated possibility such that the reduction in the power can be controlled in accordance with a cascade principle.

Subsequent to the adjustment of the guide vanes of the compressor, the power can be further reduced at high efficiency by preheating the induction air to the compressor by using extraction steam from, for example, a downstream steam cycle of a combined installation.

Advantageous and expedient further developments of the object according to the invention are claimed in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
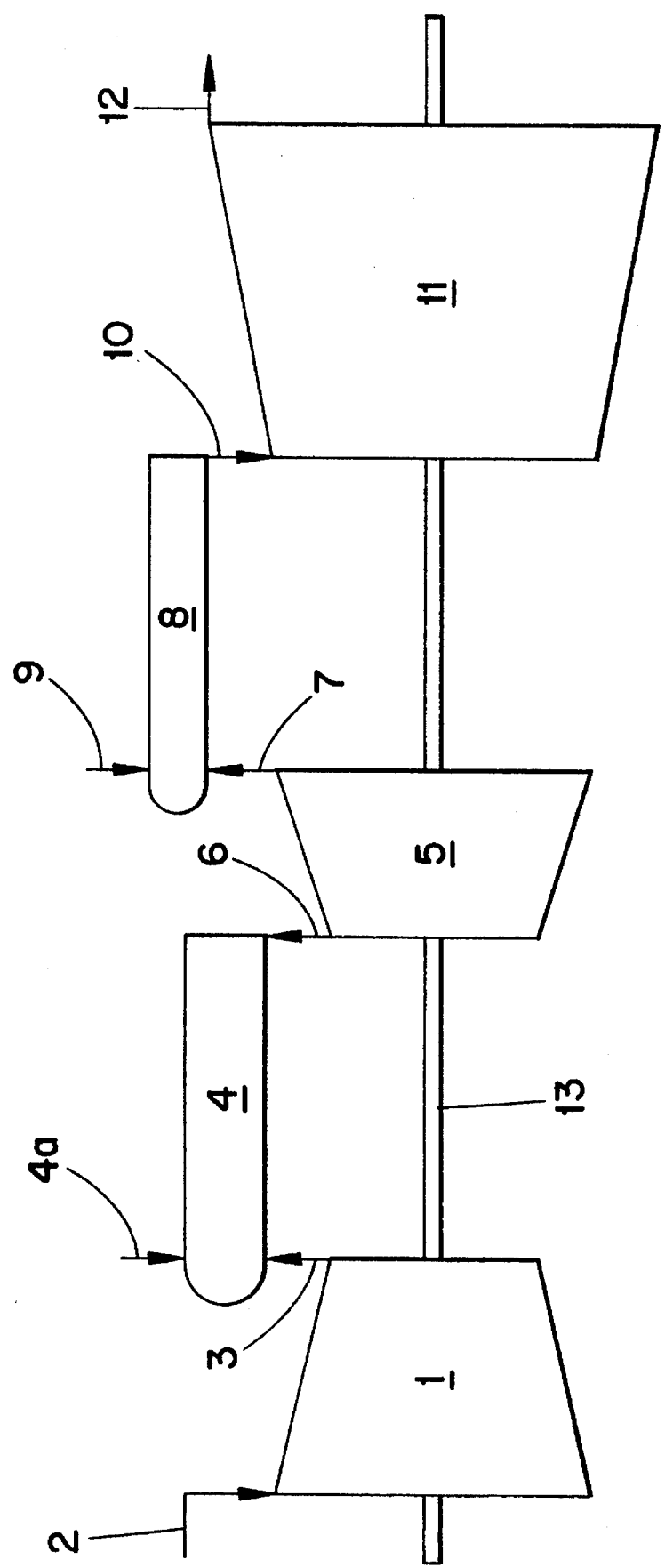
FIG. 1 shows a gas turbine with various turbomachines and combustion chambers.

Referring now to the drawings, wherein like reference numerals designate identical or corresponding parts throughout the several views, where all the features which are not essential for immediate understanding of the invention are omitted and in which the flow direction of the media is indicated by arrows, FIG. 1 shows a gas turbine which forms, further below, the basis for the control method employed. The gas turbine has a compressor unit 1 in which the compression of the induced air 2 takes place. The compressed air 3 then flows into a first combustion chamber (high-pressure combustion chamber=HP combustion chamber) 4, in which the first generation of hot gas takes place by means of a fuel 4a. A first turbine (high-pressure turbine=HP turbine) 5 operates downstream of this HP combustion chamber 4 and the hot gases 6 experience a partial expansion in this first turbine. This partial expansion has the feature that the exhaust gases 7 from the HP turbine 5 still have a relatively high temperature of the order of value of 1000° C. or more. This HP turbine 5 correspondingly consists of a small number of rotor blade stages, preferably between 1 and 3 stages. A second combustion chamber (low-pressure combustion chamber=LP combustion chamber) 8 acts downstream of the HP turbine 5 and this second combustion chamber functions on a self-ignition principle. Essentially, this LP combustion chamber 8 has the form of an annular duct through which flow occurs and into which a preferably gaseous fuel 9 is blown. At a temperature of the exhaust gases 7 from the HP turbine 5 of the level mentioned above, self-ignition takes place of the gaseous fuel 9 which has been blown in. This LP combustion chamber 8 has, furthermore, flow aids (not shown) which permit the formation of a reverse flow zone in the region of the flame front, this reverse flow zone ensuring reliable combustion. The exhaust gases 7 are again prepared as hot gases 10 in the LP combustion chamber 8 and their temperatures correspond approximately to those in the HP combustion chamber 4. Fundamentally, the temperatures of the hot gases 6, 10 have no limit which is directly due to the combustion chamber; in fact, this limit is primarily dictated by the turbine to which admission takes place and by its machine elements. The hot gases 10 are admitted to a second turbine (low-pressure turbine=LP turbine) 11 in Which the final expansion takes place. The residual thermal potential of the exhaust gases 12 can, for example, be employed for generating the steam of a downstream steam cycle. An essential feature of the gas turbine shown is that all the turbomachines and a generator 15, are supported on the same shaft 13, which is preferably supported on two bearings (not shown). The two combustion chambers 4, 8 take up the intermediate space, the HP combustion chamber 4, which is preferably configured as an annular combustion chamber, can be substantially superimposed on the compressor unit 1 in such a way that the result is a compact unit. For fluid dynamics considerations, this possibility cannot be applied with respect to the LP combustion chamber 8; it should, however, be stated that the latter combustion chamber is very short so that the complete gas turbine forms a compact unit in all planes. A heat exchanger 16 is included for preheating the air 2 entering the compressor unit 1 to reduce the power of the turbine group at high efficiency. The heat exchanger 16 may be supplied with steam extracted from a steam cycled integrated with the turbine group to utilize heat from exhaust gases 12 from the low pressure turbine 11.

Figure 2:
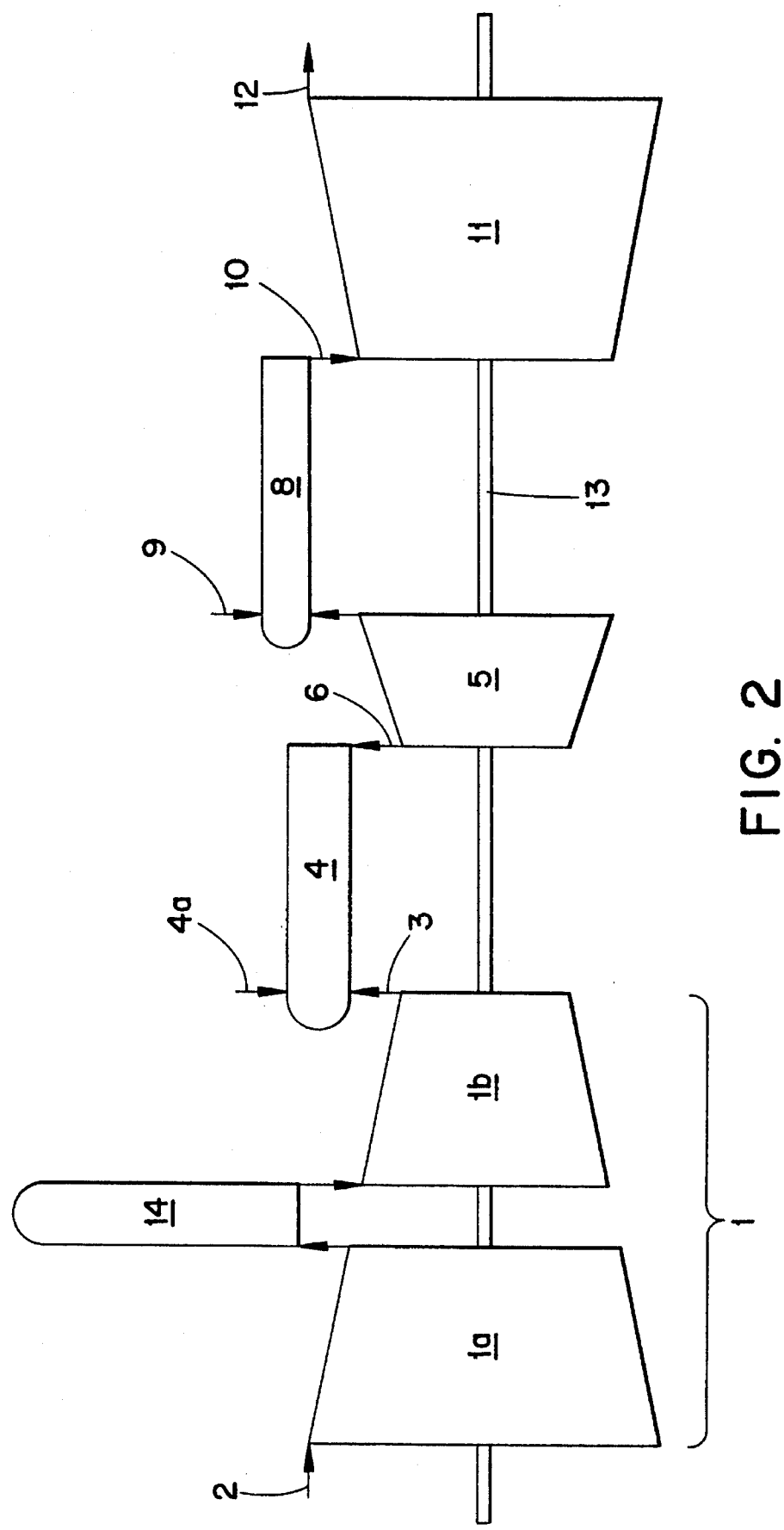
FIG. 2 shows a cycle in accordance with FIG. 1, the compressor unit being supplemented by an intercooler

FIG. 2 differs from FIG. 1 to the extent that in this case the compression of the induced air 2 takes place in two stages, an intercooler unit 14 being fitted between the LP compressor 1a and the HP compressor 1b. This is done if there is a requirement to increase the specific power of the gas turbine.

Figure 3:
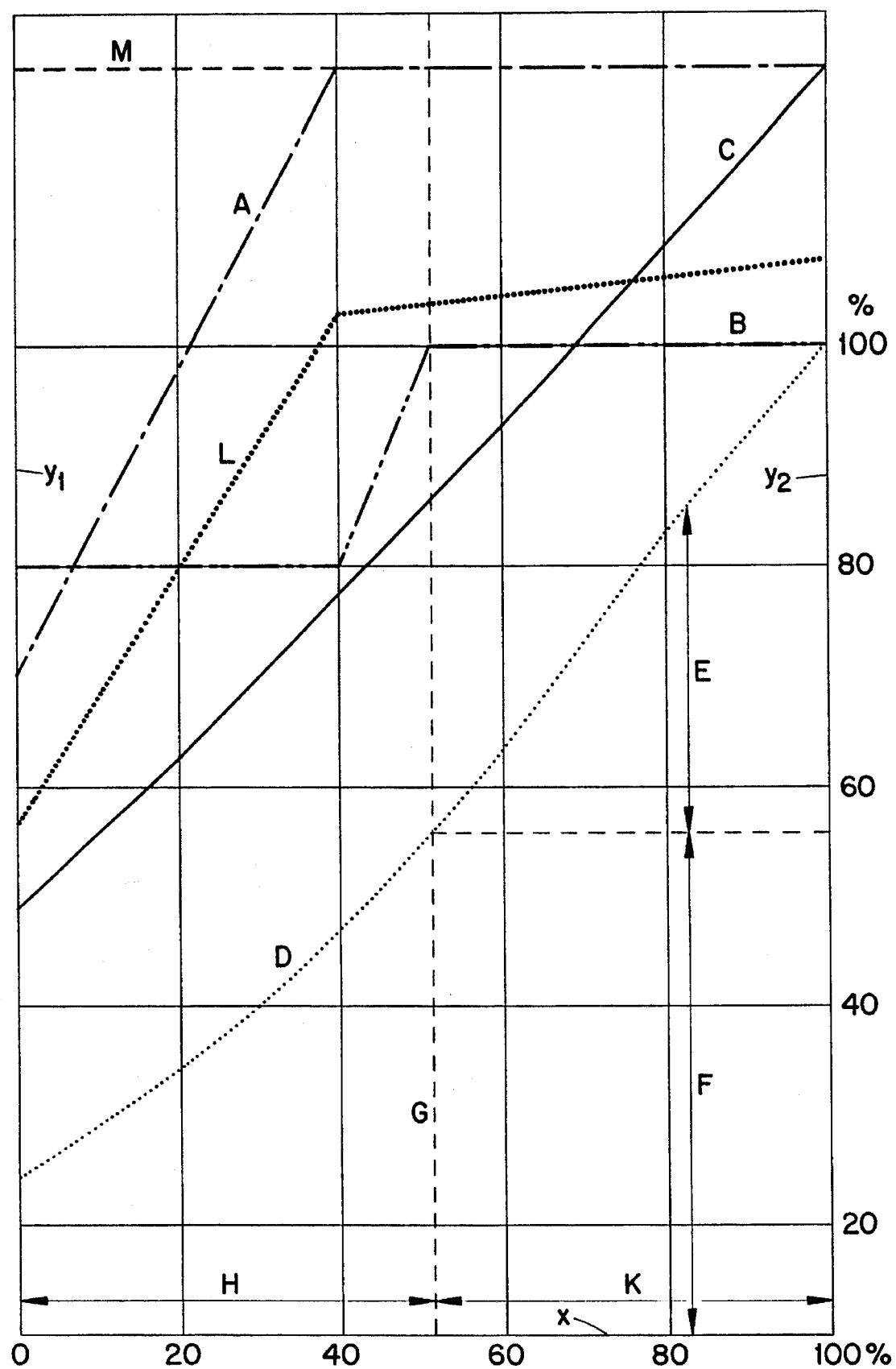
FIG. 3 shows, by using a qualitative diagram, a control method for part-load operation of an above-mentioned cycle.

The variation of the most important temperatures and of the percentage fuel consumption are represented in FIG. 3. The control method relates to a cycle which operates without preheating of the compressor air at part-load. Furthermore, the temperature before the HP turbine has already been reduced during the closing procedure of the compressor guide vane row.

In this diagram, the symbols have the following significance:

| | |
|---|---|
| X | Loading percentage |
| Y1 | Qualitative temperature |
| Y2 | Fuel quantity in |
| A | Inlet temperature to the HP turbine |
| B | Inlet guide vane row angle |
| C | Inlet temperature to the LP turbine |
| D | Total fuel quantity |
| E | Fuel quantity to the LP combustion chamber |
| F | Fuel quantity to the HP combustion chamber |
| G | Transition to operation with reheating |
| H | Operation of the HP combustion chamber alone |
| K | Operation of both combustion chambers |
| L | Outlet temperature of the HP turbine, the slight reduction being due to the swallowing capacity law of the LP turbine. The discrepancy between the two temperatures L and C, particularly in the section H, is caused by the cooling air. |
| M | Shows a control method by which the load can be reduced to zero by blowing down the compressor air. |

The circumstance that operation takes place with the HP combustion chamber only from idling to approximately half-load (abscissa X) has an enduring effect on the temperature variations. It may be seen that the nominal ignition temperature (self-ignition) is already present in practice when the LP combustion chamber is put into operation. This ensures that the burners in the LP combustion chamber are not subject to any stability problems in the transient range. Although the idling consumption is approximately a quarter of the full-load fuel quantity, this is already approximately 40% of the fuel quantity of the HP combustion chamber.

The gas turbine group is put into operation as the reciprocal of the control method described.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of establishing part-load operation in a gas turbine group, comprising a compressor unit, a first combustion chamber downstream of the compressor unit, a first turbine downstream of the first combustion chamber, a second combustion chamber operating on self-ignition and connected downstream of the first turbine, exhaust gases of the second combustion chamber being admitted to a second turbine, and at least one generator, the method comprising the steps of:

reducing a fuel flow quantity to the second combustion chamber to zero, and maintaining a fuel flow quantity to the first combustion chamber approximately constant while reducing the fuel quantity in the second combustion chamber so that a temperature of gases at an inlet to the first turbine remains constant.

2. The method as claimed in claim 1, wherein the part-load operation is operated with the second combustion chamber extinguished.

3. The method as claimed in claim 1, further comprising the step of reducing power output of the gas turbine group when the first combustion chamber is operating alone by adjusting blades of the compressor unit.

4. The method as claimed in claim 3, wherein the fuel flow quantity to the first combustion chamber is reduced as the blading is adjusted so that the temperature of gases at the inlet to the first turbine remains constant.

5. The method as claimed in claim 3, wherein at least one inlet guide vane row of the compressor unit is adjusted.

6. The method as claimed in claim 1, wherein the fuel flow quantity to the first combustion chamber is reduced for a residual reduction of power output of the turbine group to idle.

7. The method as claimed in claim 1, wherein the compressor unit consists of a low pressure compressor and a high pressure compressor and wherein compressed air flows through an intercooler downstream of the low pressure compressor and upstream of the high pressure compressor.

8. The method as claimed in claim 1, wherein a load reduction further comprises the step of preheating compressor inlet air.

9. The method as claimed in claim 8, wherein the step of preheating the compressor inlet air is by steam.

10. The method as claimed in claim 9, wherein the steam is taken from a steam cycle.

* * * * *